United States Patent [19]
Brocas

[11] 3,851,452
[45] Dec. 3, 1974

[54] GUARDED ROTARY MOWERS

[76] Inventor: Alexander N. Brocas, 26 Stanton Ter., Auckland, New Zealand

[22] Filed: Jan. 19, 1971

[21] Appl. No.: 107,713

[30] Foreign Application Priority Data
Jan. 23, 1970 New Zealand .................. 159036
Apr. 8, 1970 New Zealand .................. 159781

[52] U.S. Cl. ............................ 56/17.4, 56/320.2
[51] Int. Cl. ................................. A01d 35/12
[58] Field of Search ........ 56/13.4, 17.4, 255, 320.1, 56/320.2, 10.5

[56] References Cited
UNITED STATES PATENTS
| | | | |
|---|---|---|---|
| 3,002,331 | 10/1961 | Denney | 56/13.4 |
| 3,057,140 | 10/1962 | Ridenour et al. | 56/10.5 |
| 3,481,124 | 12/1969 | Machovina | 56/17.4 |

*Primary Examiner*—Russell R. Kinsey
*Assistant Examiner*—J. Q. Lever
*Attorney, Agent, or Firm*—Holman & Stern

[57] ABSTRACT

A safety guard for a rotary mower having a blade rotatable in a substantially horizontal plane, which guard lies between the blade and the grass to be cut, has its centre raised towards the blade which is appreciably cranked (so that the cutting edges are lower than the centre) to reduce the frictional drag of the grass against the guard when the mower is propelled along. The only part of the blade path accessibe is a substantially arcuate slot extending from side to side via the front of the mower and lying for the most part substantially directly below the annulus swept by the rotating cutting edges of the blade. The guard may be constructed as a separate fitting in one or more parts to be attached to the mower housing, may be partly separate and partly integral with the mower housing or totally integral with the mower housing. A suitably placed baffle above the blade ensures a frontal updraft into the cutting slot, facilitating the close cutting of the grass.

18 Claims, 5 Drawing Figures

GUARDED ROTARY MOWERS

BACKGROUND OF THE INVENTION

This invention concerns improvements for the type of motorised lawn mower having a blade which is rotatable in a substantially horizontal plane, such types being commonly known as "rotary mowers."

As is well known, a considerable number of accidents occur each year involving users of this type of mower. On sloping lawns there is always a risk that an operator may slip on a downhill slope in which case his foot might pass underneath the protective side walls of the more housing to be cut by the blade which rotates at a considerable speed and when such a mower is being pushed uphill, there is a danger that it might mower back upon the user in some circumstances. Also, accidents frequently occur when such mowers are being started, either intentionally or inadvertently, as the blade rotates as soon as the motor fires since there is no clutch between motor and blade on most models. Because of these dangers, considerable attention has been given in the past to ensuring that the side protective walls of the housing extend below the path described by the tips of the rotating blade. Also, over recent years, attempts have been made to devise suitable guards to prevent the risk of injury. Reference may be made to U.S. Pat. Specification Nos. 2,906,082, 2,934,882, 3,002,331, 3,148,490 and 3,312,049. These each disclose the use of a guard fitted to a rotary mower substantially in only one plane below the blade so that the guard lies between the blade and the grass to be cut and spans between the side walls of the housing. The guards are grills, meshes or sheets and as the above Specifications show, they provide differing degrees of safety.

The main difficulty with the prior art guards is that they all result in such an increased effort by the operator necessary to propel the mower when compared to an unguarded mower that they have not received public approval. Even in an unguarded mower the friction between the rotating blade and the ground has almost necessitated the use of a cranked blade, the central portion of which is higher from the ground than the cutting tips in use.

Thus it is perhaps not surprising that guarded rotary mowers, such as disclosed by the prior art, involving the use of a substantial structure below the blade, have not found ready acceptance.

SUMMARY OF THE INVENTION

A first object of the invention is to provide a guard for a rotary mower and/or a rotary mower with guard means restricting access to the blade path from below. A second object is to provide a guard or guard means which does not materially increase the effort needed to propel the mower and a third object is to provide a guard or guard means which has inherent strength by reason of its shape.

In one aspect the present invention consists in a safety guard for a rotary mower of the type including a housing which is open at its bottom and a cranked blade having a central portion and one or more cutting tips which are lower than the central portion the blade being rotatable in a substantially horizontal plane within the housing, said safety guard comprising an inverted dish-shaped body; having a central portion and peripheral portions lower than the central portion the guard being adapted to be fastened under the blade to the housing with the central portion of the guard being adjacent the central portion of the blade and the peripheral portions adjacent the one or more cutting tips so that the path swept by the blade during a revolution is suitably inaccessible from below but the portion of the periphery of the guard at the front being formed to uncover only the effective cutting portions of the cutting tips of the blade around a part annular portion to allow a substantially unrestricted width of swath to be cut as the mower is propelled along.

In a second aspect the present invention consists in the combination of a safety guard and a rotary mower in which the rotary mower has a cranked blade provided with a central portion and one or more cutting tips which are lower than the central portion, a housing within which the blade is rotatable, wheels supporting the housing clear of the ground, and a motor supported on the housing and able to rotate the blade, said safety guard comprising an inverted dish-shaped body having a central portion and peripheral portions lower than the central portion, the safety guard body lying under the blade with the central portion of the guard adjacent the central portion of the blade and the peripheral lower portion adjacent the one or more cutting tips so that the path swept by the blade during a revolution is suitably inaccessible from below except for a part annular portion swept by the one or more cutting tips of the blade which is completely unguarded to allow a substantially unrestricted width of swath to be cut as the mower is propelled along, the part annular portion being narrow enough in a radial direction to expose only the effective cutting portions of the tips in normal use.

While the guard or guard means may thus comprise a simple dished disc of mesh, grill or sheet-like material attached to and rotating with the blade in conjunction with lips extending inwardly from the side walls of the mower housing to cover substantially the whole semi annulus of that annular path swept by the one or more cutting tips of the blade which is at the rear of the mower, it is preferred that the guard or guard means cover the whole of the path swept by the blade during a revolution except for that semi annular portion of the annulus swept by the blade tips which is at the front of the mower and that the safety guard means be either an integral part of the mower housing or, as is the guard, a separate attachment able to be secured to the mower housing.

BRIEF DESCRIPTION OF THE DRAWINGS

The preferred form of the present invention will be described with reference to the accompanying drawings in which.

DETAILED DESCRIPTION OF THE INVENTION

Figure 3:
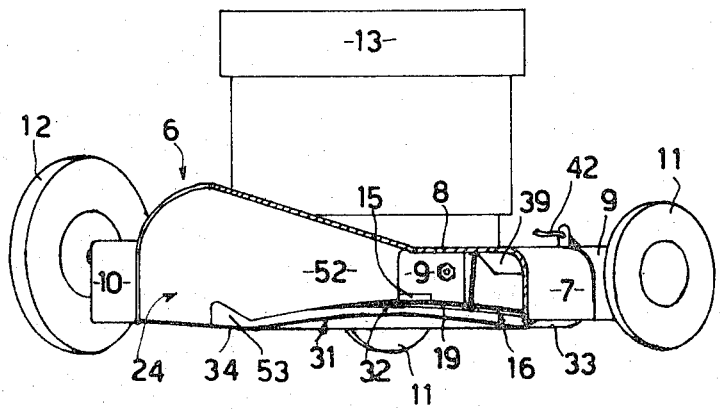
FIG. 3 shows a cross sectional view of the rotary mower in the plane III — III of FIG. 1.
Figure 4:
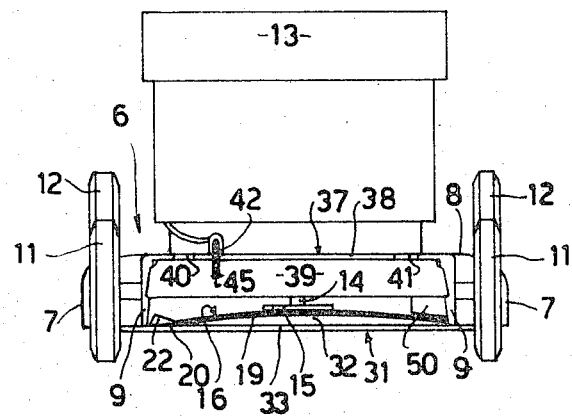
FIG. 4 shows a front elevation of the mower of FIG. 1 and, FIG. 5 shows a partial cross section through the blade, engine shaft and guard in the plane V — V of FIG. 1.

A rotary mower includes a housing 6 comprising side walls 7 and top wall 8. Suitable brackets 9 and 10 at the front and rear of the housing carry front and rear wheels 11 and 12 respectively which, as can be seen in FIGS. 3 and 4, support the housing clear of the ground in use and enable the mower to be pushed along in the usual manner by handles (not shown) attached to the housing near the rear wheels. To top wall 8 of the housing is bolted by bolts 26 (FIG. 2) a motor which has been represented schematically by 13. The drive shaft 14 (FIGS. 4 and 5) of the motor has some form of support 15 fitted to it to suitably hold a blade 16 against rotation relative to the drive shaft 14, the blade being held against the support 15 by means of a bolt 17 engaging in a threaded hole 18 in the end of the drive shaft. The support 15 may for instance be a taper fit on the drive shaft or may be keyed to it. Instead of the bolt 17 the end of the drive shaft may be threaded and a nut used to secure the blade to the support 15 and shaft 14. Relative rotation between the blade 16 and the support 15 may be prevented in a number of ways such as by bolting the blade to the support, arranging that the support cradles around the side edges of the blade, and so on.

The mower blade 16 conveniently has the double-ended form illustrated although it may comprise a balanced single ended form or a disc carrying several cutting edges around its periphery. Whatever form the blade takes, it must have a central portion 19 which is higher than each of the one or more cutting tips such as 20 and 21 so that the blade assumes a cranked appearance — this can be seen from FIGS. 3 to 5. It is common for the blades of ordinary unguarded rotary mowers to have this cranked appearance since it reduces the frictional loss of power due to contact between the blade and the grass. The cutting tips have the usual fins 22 and 23 which serve to propel the grass clippings out of the discharge shute 24 provided in one of the side walls 7. The discharge shute may be at the rear of the mower as is shown or conventionally it may be in a side delivery position such as 25 between the front and rear wheels 11 and 12.

According to this invention a safety guard 31 for the above mower is preferably of sheet form, i.e., with a continuous surface, although it may be in the form of a grill or mesh. It comprises a central portion 32 and peripheral portions 33 and 34 in a dished configuration which can be seen in FIG. 5. The safety guard is adapted to lie under the blade 16 with the central portion 32 adjacent the central portion 19 of the blade and the peripheral portion 33 adjacent the one or more cutting tips of the blade so that the central area of the path swept by the blade during a revolution is suitably inaccessible from below but at least a portion of the annular path swept by the one or more cutting tips such as 20 or 21 of the blade is unguarded to allow a substantially unrestricted width of swath to be cut as the mower is propelled along. Thus in one form the guard may comprise a disc in the form of a sheet, grill or mesh secured directly to the blade and adapted to rotate therewith. In such a case the side walls 7 of the housing would preferably have lips extending inwardly below the blade to meet the guard and cover the semi annulus of the annular path swept by the one or more cutting tips of the blade which is at the rear of the mower so that the combined effect would be to leave uncovered only the forward semi annulus of that path. However, it is preferred that part 34 of the peripheral portion extend to the side walls 7 of the housing either to be fastened thereto by an upturned flange 35 (FIG. 5) forming attachment means, preferably allowing the guard to be demountably attached for servicing the blade, or being an integral part of the housing. In the latter case the housing may, for example, be a casting including integral guard means and the top wall 8 could be demountably attached to the side walls to allow the motor and the blade to be removed for servicing. The flange 35 may be attached to the side walls by suitable screws, bolts or clips.

Figure 1:
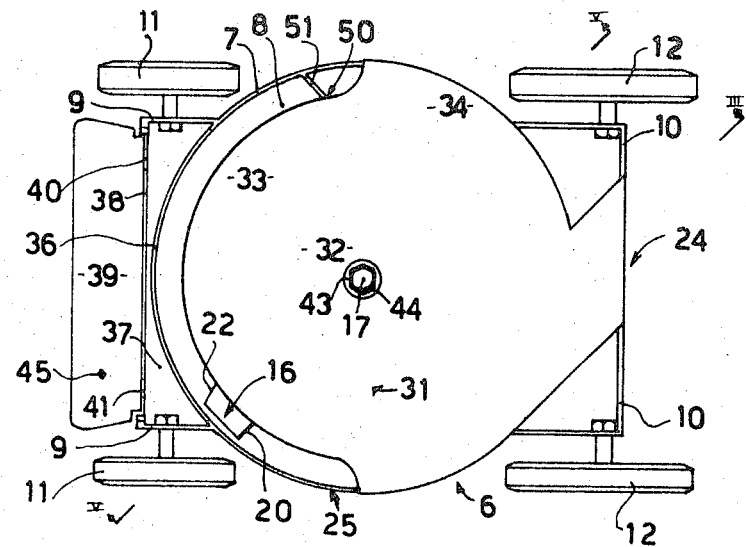
FIG. 1 shows a plan view from below of a rotary mower (minus handles), fitted with the preferred form of guard.

As can be seen from FIG. 1 the part 33 of the peripheral portion of the guard leaves uncovered the semi annulus of the annular path swept by the one or more cutting tips during a blade revolution which extends from side to side of the mower via the front. Thus the width of the cutting swath of the mower is unaltered. An uncovered width in the vicinity of 2.5 to 5 centimeters appears to be satisfactory with a double-ended blade rotated at about 3,000 revolutions per minute.

As will be appreciated the portion 36 of the side walls 7 at the front of the mower is a cutaway portion to avoid flattening the grass entering the cutting path, at least in the central region. The apron 37 of the top wall 8 of the housing may include a low front wall along edge 38, it being usual to provide that the angle between the bottom edge of such a wall and the tip of the blade should be not more than 15° to the horizontal to minimise the chance of foreign bodies, such as stones, being hurled out of the front of the mower when struck by the blade. Alternatively, and as illustrated, a flap 39 may be hinged at 40 and 41 to the edge 38 and at 45 attached with a suitable control cable 42 enabling the inclination of the flap to be altered from the handle of the mower.

Figure 5:
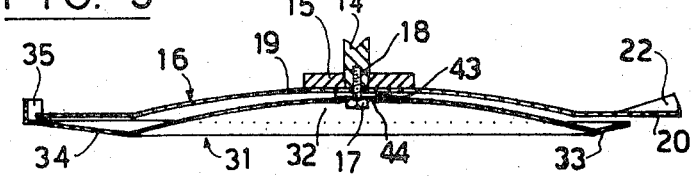

As can be seen from FIG. 5, the cross section through a diameter of the guard is basically that of a broad, flat W since it is preferable that at least the part 33 of the peripheral portion, which is adjacent the unguarded semi annulus of the blade tip path, be upturned to provide a ski which minimises any tendency for the guard to dig into the ground when the mower is being propelled and guides the guard over obstructions. Preferably this upturning at the peripheral portions takes place around the whole of the guard since a substantial increase in the strength of the guard is thereby provided. It is also preferable that the guard include bearing means and that the blade include bearing means, the two interacting so that upward movement of the guard at the central portion 32 is restrained by the blade 16. The simplest, and yet quite effective, form in which this result may be obtained is for a washer 43 beneath the head of bolt 17 to be of a fairly large diameter and for there to be a hole 44 of lesser diameter than the washer 43 in the central portion 32 of the guard, the hole being of sufficient diameter to clear the head of bolt 17 so that an area around the circumference of this hole is in direct bearing contact with the rotating washer when there is an upthrust on the guard. It would, of course, be possible to provide a suitable thrust bearing perhaps of the ball or roller type between the guard and blade but this is probably an unnecessary elaboration.

To assist in the creation of a low pressure area in the front of the housing, a baffle 50 is provided within the housing between the top wall 8, the blade 16 and the side walls 7. The baffle just clears the blade and for this purpose has a suitably shaped nick 51 in it to clear the fins 22 and 23. Its surface adjacent the blade closely approximates in shape that of the surface of the guide 52, details of which are described below and which is illustrated in FIG. 3. It has been found that as each fin 22 or 23 of the blade passes this baffle, a low pressure area is created at the front of the mower which tends to cause grass which is to be cut in that region to stand upright due to the inrush of air into the front area of the mower from outside the mower. This occurs when the baffle is located on the side of the mower immediately preceding the front area when viewed in the direction of blade rotation. Thus in FIGS. 1 and 2 the blade rotates in an anti-clockwise direction when viewed from below. A similar effect can be achieved by arranging for there to be a side delivery on the same side as the baffle 50 which is a non-conventional position since a side delivery shute is normally on the opposite side. It has been found that a similar low pressure area is created immediately after the blade fin passes a discharge shute.

Figure 2:
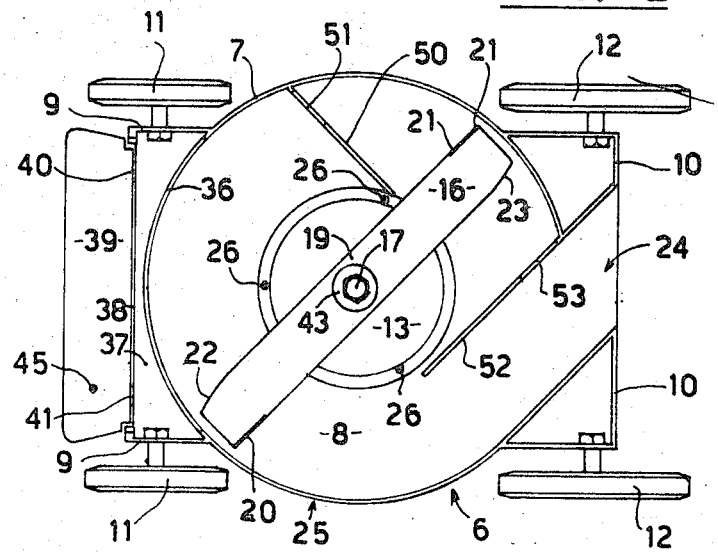
FIG. 2 shows a plan view from below of the rotary mower with the guard removed.

As is shown in FIG. 2 it is preferable, although not essential, that a guide 52 be provided in line with the far wall of the discharge shute when viewed in the direction of blade rotation, between the blade, the top and the side walls of the housing. The guide 52 includes a nick 53 to clear the fins 22 and 23 of the blade. Otherwise it conforms closely to the shape of the blade. With a rear discharge such as is illustrated or side delivery at region 25, the guide where it is provided is separate from the baffle 50 but with a side discharge at the position of the baffle 50, the baffle may conveniently function also as the guide.

It has been found that, since the guard has an upwardly dished central portion and since it is common to provide that the housing of a rotary mower be slightly higher from the ground at the rear than at the front so that the rear peripheral portions of the guard are higher from the ground than the front, the friction between the guard and the grass is greatly reduced since in distinction to prior art guards only the front peripheral portion 33 of the guard leads to any greater frictional forces when compared to an unguarded rotary mower. In fact, when a suitable frontal low pressure region is created within the housing, the updraft tends to raise the grass to be cut at the time of cutting, the grass then flattening down to its normal position after the mower has passed so that the blade may be set higher from the ground than with a normal unguarded mower without an equivalent frontal updraft while yet giving the same closeness of cut. Because the mower housing is thus able to travel further from the ground, this too reduces the effect of the frictional forces of the grass against the guard and in fact under some conditions it has been estimated that the guarded mower, as illustrated, is easier to push than an unguarded mower of otherwise the same construction. Furthermore, the cross sectional shape through a diameter of the present guard, which is dished at the centre and is preferably that of a broad, flattened W, gives it great inherent strength while yet allowing the guard to be made of thin sheet material. With the type of guard illustrated, the mower has obviously improved antiscalping characteristics when pushed over a verge in comparison with unguarded mowers. Finally, but most importantly, since only the very minimum of the path described by the blade is left uncovered in the most preferred form, the safety characteristics are obviously great.

What I claim is:

1. A safety guard for a rotary mower of the type including a housing which is open at its bottom and a cranked blade having a central portion and one or more cutting tips which are lower than the central portion, the blade being rotatable in a substantially horizontal plane, within the housing, said safety guard comprising an inverted dish-shaped body; having a central portion and peripheral portions lower than the central portion, the guard being adapted to be fastened under the blade to the housing with the central portion of the guard being adjacent the central portion of the blade and the peripheral portions adjacent the one or more cutting tips, so that the path swept by the blade during a revolution is suitably inaccessible from below but the portion of the periphery of the guard at the front being formed to uncover only the effective cutting portions of the cutting tips of the blade around a part annular portion to allow a substantially unrestricted width of swath to be cut as the mower is propelled therealong, the front peripheral portion of the guard being inclined upwardly to provide a ski effect in use guiding the guard over obstructions and minimizing the tendency for the guard to dig in when the mower is being propelled.

2. The safety guard as claimed in claim 1 wherein part of the peripheral portion of the guard covers substantially the whole semi annulus of that annular path swept by the one or more cutting tips of the blade which is at the rear of the mower.

3. The safety guard as claimed in claim 2 wherein the guard body has a bearing means on the central portion and the blade has a bearing means on the central portion so that upward movement of the central portion of the guard body is restrained by the interaction of said bearing means.

4. The safety guard as claimed in claim 3 wherein the guard body comprises a sheet of material.

5. The safety guard as claimed in claim 3 wherein the guard body comprises a grid or mesh of material.

6. A safety guard for a rotary mower of the type including a housing which is open at the bottom and a cranked blade having a central portion with a bearing means and one or more cutting tips which are lower than said central portion, the blade being rotatable in a substantially horizontal plane within the housing, said safety guard comprising an inverted dish-shaped sheet of material having a central portion and peripheral portions lower than the central portion the central portion having a bearing means on its uppermost surface, the safety guard being adapted to be fastened under the blade with the bearing means able to interact so that upward deformation of the central portion of the guard is restrained by the blade, the peripheral portion of the guard at the front of the mower being formed to leave accessible from below the semi annulus of the annular path swept by the one or more cutting tips during a revolution of the blade, the radial width of exposed semi annulus being narrow enough to expose only the effective portions of the tips in use, the guard rendering inaccessible from below all other parts of the path swept by the blade during a revolution and the other part of the peripheral portion including attachment means enabling attachment of the guard to the housing.

7. The combination of a safety guard and a rotary mower in which the rotary mower has a cranked blade provided with a central portion and one or more cutting tips which are lower than the central portion, a housing within which the blade is rotatable, wheels supporting the housing clear of the ground, and a motor supported on the housing and able to rotate the blade, said safety guard comprising an inverted dish-shaped body having a central portion and peripheral portions lower than the central portion, the safety guard body lying under the blade with the central portion of the guard adjacent the central portion of the blade and the peripheral lower portion adjacent the one or more cutting tips so that the path swept by the blade during a revolution is suitably inaccessible from below except for a part annular portion swept by the one or more cutting tips of the blade which is completely unguarded to allow a substantially unrestricted width of swath to be cut as the mower is propelled along, the part annular portion being narrow enough in a radial direction to expose only the effective cutting portions of the tips in normal use and that part of the peripheral portion of and just clearing the blade so that a low-pressure in the frontal region of the mower is produced after each of the one or more cutting tips passes the baffle, thus tending to cause grass to be cut in that region to stand upright and the guide just clearing the blade and being in line with the furthermost wall viewed in the direction of blade rotation of a clipping ejection chute.

8. The rotary mower as claimed in claim 7 wherein the safety body is attached to the blade to rotate therewith and the housing includes side walls having lip means which extend inwardly from the lower edges of the side walls to cover in conjunction with said safety guard body substantially the whole semi annulus of that annular path swept by the one or more cutting tips of the blade which is at the rear of the mower.

9. The rotary mower as claimed in claim 7 wherein a part of the peripheral portion of the safety guard means body covers substantially the whole semi annulus of that annular path swept by the one or more cutting tips of the blade which is at the rear of the mower and includes attachment means enabling the guard means body to be attached to the housing.

10. The rotary mower as claimed in claim 7 wherein a part of the peripheral portion of the safety guard means body covers substantially the whole semi annulus of that annular path swept by the one or more cutting tips of the blade which is at the rear of the mower and such part is integral with the housing and the housing includes side walls and a top wall on which the motor is supported and which is demountably secured to the side walls to allow the motor and blade to be withdrawn with the top wall for maintenance.

11. The rotary mower as claimed in claim 9 wherein the safety guard means body is demountably attached to the housing.

12. The rotary mower as claimed in claim 11 wherein the safety guard means body is a sheet of material.

13. The rotary mower as claimed in claim 12 wherein the guard means body includes bearing means at the central portion and the blade has a bearing means on the central portion so that upward movement of the central portion of the guard means body is restrained by the interaction of the said bearing means.

14. The rotary mower as claimed in claim 13 in which the safety guard means body is substantially W-shaped in cross section through a diameter.

15. The rotary mower as claimed in claim 12 in which the housing comprises side and top walls and includes a baffle between the blade, a side wall and the top wall thereof immediately preceding the front of the mower in the direction of blade rotation and just clearing the blade so that a low pressure area in the frontal region of the mower is produced after each of the one or more cutting tips passes the baffle, thus tending to cause grass to be cut in that region to stand upright.

16. The rotary mower as claimed in claim 15 in which the housing includes a clipping ejection chute through a side wall and there is a guide between the blade, a side wall and the top wall of the housing, the guide just clearing the blade and being in line with the furthermost wall viewed in the direction of blade rotation of the clipping ejection chute.

17. The combination of a safety guard and a rotary mower, said mower having a cranked blade provided with a central portion and one or more cutting tips which are lower than said central portion, a housing within which the blade is rotatable in a substantially horizontal plane and having side walls, wheels supporting the housing clear of the ground, and a motor supported on the housing and able to rotate the blade, said safety guard comprising an inverted dish-shaped body having a substantially continuous surface with a central portion and peripheral portions lower than the central portion, the safety guard lying under the blade with the central portion of the guard adjacent the central portion of the blade, part of the peripheral portion of the guard leaving accessible from below the semi annulus of the annular path swept by the one or more cutting tips during a revolution of the blade which is at the front of the mower, the radial width of the exposed semi annulus being narrow enough to expose only the effective cutting portions of the tips in use, such front arcuate part being upturned to provide a ski effect reducing any tendency of the guard to dig into the ground when the mower is propelled, the guard rendering suitably inaccessible from below all other parts of the path swept by the blade during a revolution and the guard being supported at part of the peripheral portion by the side walls of the housing.

18. The combination of a safety guard and a rotary mower in which the rotary mower has a cranked blade provided with a central portion and one or more cutting tips which are lower than the central portion, a housing within which the blade is rotatable, said housing having side and top walls and a clipping ejection chute through a side wall, wheels supporting the housing clear of the ground, and a motor supported on the housing and able to rotate the blade, said safety guard comprising an inverted dish-shaped body having a central portion and peripheral portions lower than the central portion, the safety guard body lying under the blade with the central portion of the guard adjacent the central portion of the blade and the peripheral lower portion adjacent the one or more cutting tips so that the path swept by the blade during a revolution is suitably inaccessible from below except for a part annular portion swept by the one or more cutting tips of the blade which is completely unguarded to allow a substantially unrestricted width of swath to be cut as the mower is propelled along, the part annular portion being narrow enough in a radial direction to expose only the effective cutting portions of the tips in normal use and there being a baffle and a guide between the blade, a side wall and the top wall of the housing, the baffle immediately preceding the front of the mower in the direction of blade rotation and just clearing the blade so that a low pressure area in the frontal region of the mower is produced after each of the one or more cutting tips passes the baffle, thus causing grass to be cut in that region to stand upright and the guide just clearing the blade and being in line with the furthermost wall viewed in the direction of blade rotation of the clipping ejection chute.

* * * * *